United States Patent
Kim et al.

(10) Patent No.: US 12,344,772 B2
(45) Date of Patent: Jul. 1, 2025

(54) ADHESIVE FILM, OPTICAL MEMBER COMPRISING SAME, AND OPTICAL DISPLAY DEVICE COMPRISING SAME

(71) Applicant: SAMSUNG SDI CO., LTD., Yongin-si (KR)

(72) Inventors: Do Young Kim, Suwon-si (KR); Young Jong Kim, Suwon-si (KR); Seung Hoon Lee, Suwon-si (KR); Seong Heun Cho, Suwon-si (KR); Il Jin Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 125 days.

(21) Appl. No.: 18/043,896

(22) PCT Filed: Sep. 1, 2021

(86) PCT No.: PCT/KR2021/011737
§ 371 (c)(1),
(2) Date: Mar. 2, 2023

(87) PCT Pub. No.: WO2022/050675
PCT Pub. Date: Mar. 10, 2022

(65) Prior Publication Data
US 2023/0332024 A1    Oct. 19, 2023

(30) Foreign Application Priority Data
Sep. 2, 2020    (KR) .................. 10-2020-0111946

(51) Int. Cl.
*C09J 133/08* (2006.01)
*C09J 11/04* (2006.01)
*G06F 3/041* (2006.01)

(52) U.S. Cl.
CPC ............. *C09J 133/08* (2013.01); *C09J 11/04* (2013.01); *G06F 3/0412* (2013.01);
(Continued)

(58) Field of Classification Search
None
See application file for complete search history.

(56) References Cited

U.S. PATENT DOCUMENTS

| | | |
|---|---|---|
| 2002/0098352 A1 | 7/2002 | Kishioka |
| 2009/0196911 A1 | 8/2009 | Loubert et al. |

(Continued)

FOREIGN PATENT DOCUMENTS

| | | |
|---|---|---|
| JP | 2002-173656 A | 6/2002 |
| JP | 2008-268414 A | 11/2008 |

(Continued)

OTHER PUBLICATIONS

Machine translation of JP 2017-014376 A (Year: 2017).*
(Continued)

*Primary Examiner* — Ramsey Zacharia
(74) *Attorney, Agent, or Firm* — Womble Bond Dickinson (US) LLP

(57) ABSTRACT

Provided are an adhesive film, an optical member comprising same, and an optical display device comprising same, the adhesive film comprising a (meth)acryl-based binder containing an aromatic group and a hydroxyl group, inorganic particles, and a trigger polymer, wherein the trigger polymer has a melting point of about 0° C. or more, the adhesive film has a haze of about 2% or less, and an adhesive film has a ratio of adhesive strength of about 10 or more according to Equation 1.

24 Claims, 1 Drawing Sheet

(52) U.S. Cl.
CPC ...... *C09J 2301/312* (2020.08); *C09J 2400/16* (2013.01); *C09J 2433/00* (2013.01)

(56) References Cited

U.S. PATENT DOCUMENTS

| | | | |
|---|---|---|---|
| 2016/0117032 A1* | 4/2016 | Lin | G06F 3/04164 345/173 |
| 2019/0077999 A1 | 3/2019 | Ieda et al. | |

FOREIGN PATENT DOCUMENTS

| | | |
|---|---|---|
| JP | 2010-007044 A | 1/2010 |
| JP | 5354691 B2 | 11/2013 |
| JP | 2014-015614 A | 1/2014 |
| JP | 2015-124320 A | 7/2015 |
| JP | 2017-014376 A | 1/2017 |
| JP | 6207387 B2 | 10/2017 |
| JP | 2022-504418 A | 1/2022 |
| JP | 2024-075717 A | 6/2024 |
| KR | 10-2007-0055363 A | 5/2007 |
| KR | 10-2019-0140364 A | 12/2019 |
| KR | 10-2020-0049386 A | 5/2020 |
| KR | 10-2020-0091618 A | 7/2020 |
| WO | WO 2016/121794 A1 | 8/2016 |
| WO | WO 2018/092905 A1 | 5/2018 |
| WO | WO 2020/091450 A | 5/2020 |

OTHER PUBLICATIONS

Machine translation of WO 2020/091450 A1 (Year: 2020).*
International Search Report of PCT/KR2021/011737, Dec. 9, 2021, 5 pages.

* cited by examiner

[FIG. 1]
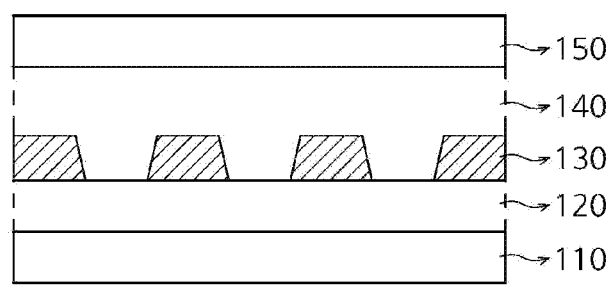
[FIG. 2]
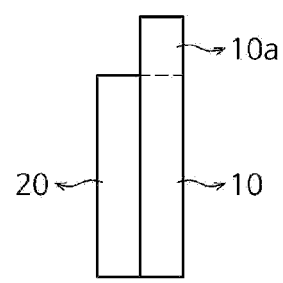

ADHESIVE FILM, OPTICAL MEMBER COMPRISING SAME, AND OPTICAL DISPLAY DEVICE COMPRISING SAME

CROSS-REFERENCE TO RELATED APPLICATIONS

This application is a U.S. National Phase Patent Application of International Application Number PCT/KR2021/011737, filed on Sep. 1, 2021, which claims priority to Korean Patent Application Number 10-2020-0111946, filed on Sep. 2, 2020, the entire content of each of which is incorporated herein by reference.

TECHNICAL FIELD

The present invention relates to an adhesive film, an optical member including the same, and an optical display device including the same.

BACKGROUND ART

A light emitting diode display, such as an organic light emitting diode display and the like, displays a screen using light emitted from a light emitting layer in a light emitting diode. However, 80% or more of light emitted from the light emitting layer is reflected or absorbed at an interface between various layer structures of the light emitting diode or the display or inside the layer structures instead of being emitted through a front surface of the light emitting diode display. As a result, the light emitting diode display has low light extraction efficiency and requires increase in power consumption in order to realize target luminance, causing reduction in lifespan of the light emitting diode. Accordingly, various attempts have been continuously made to improve the light extraction efficiency by changing the layer structure of the light emitting diode.

On the other hand, a touchscreen panel stacked on the light emitting diode is formed of a metallic material, such as aluminum, titanium, and the like, and thus has a much higher index of refraction than a typical adhesive film. Thus, there is a need for an additional layer or an adhesive film capable of reducing a difference in index of refraction with other layers in order to improve the light extraction efficiency through reduction in difference in index of refraction between layers. This can cause deterioration in manufacturing processability of an optical display device. Therefore, there is a need for an adhesive layer capable of improving the light extraction efficiency while ensuring processability.

The background technique of the present invention is disclosed in Korean Patent Laid-open Publication No. 10-2007-0055363 and the like.

DISCLOSURE

Technical Problem

It is one aspect of the present invention to provide an adhesive film that allows remarkable increase in adhesive strength by heat treatment.

It is another aspect of the present invention to provide an adhesive film that has low haze to secure good optical characteristics and exhibits good step embedding properties.

It is a further aspect of the present invention to provide an adhesive film that has high index of refraction.

It is yet another aspect of the present invention to provide an adhesive film that has good processability.

Technical Solution

One aspect of the present invention relates to an adhesive film.

1. The adhesive film includes: a (meth)acrylic based binder containing an aromatic group and hydroxyl group, inorganic particles, and a trigger polymer, wherein the trigger polymer has a melting temperature (Tm) of about 0° C. or more, the adhesive film has a haze of about 2% or less and the adhesive film has an adhesive strength ratio of about 10 or more, as calculated according to Equation 1:

$$\text{Adhesive strength ratio} = B/A \qquad \text{[Equation 1]}$$

where A is initial adhesive strength (unit: gf/inch) of the adhesive film with respect to a glass plate, and B is adhesive strength (unit: gf/inch) of the adhesive film with respect to the glass plate after the adhesive film is attached to the glass plate and left at 50° C. for 1,000 sec.

2. The adhesive film includes: a (meth)acrylic based binder containing an aromatic group and hydroxyl group, inorganic particles, and a trigger polymer, wherein the trigger polymer has a melting temperature (Tm) of about 0° C. or more and the adhesive film has a haze of about 2% or less, the adhesive film has an initial adhesive strength of about 100 gf/inch or less with respect to a glass plate, and the adhesive film has an adhesive strength of about 500 gf/inch or more with respect to the glass plate after the adhesive film is attached to the glass plate and left at 50° C. for 1,000 sec.

3. In 1, in Equation 1, A may be about 100 gf/inch or less and B may be about 500 gf/inch or more.

4. In 1 to 3, the adhesive film may have an index of refraction of about 1.5 or more.

5. In 1 to 4, the inorganic particles may have an index of refraction of about 1.5 or more.

6. In 1 to 5, the inorganic particles may include zirconia.

7. In 1 to 6, the inorganic particles may be present in an amount of about 10 wt % to about 90 wt % in the adhesive film.

8. In 1 to 7, the (meth)acrylic based binder containing an aromatic group and hydroxyl group may include a (meth)acrylic copolymer of a monomer mixture including an aromatic group-containing (meth)acrylic monomer and a hydroxyl group-containing (meth)acrylic monomer.

9. In 8, the aromatic group-containing (meth)acrylic monomer may include a monomer of Formula 1:

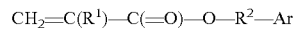

$$CH_2=C(R^1)—C(=O)—O—R^2—Ar \qquad \text{[Formula 1]}$$

where:

$R^1$ is hydrogen or a methyl group;

$R^2$ is a single bond, a substituted or unsubstituted $C_1$ to $C_{10}$ alkylene group, or a substituted or unsubstituted $C_1$ to $C_{10}$ alkyleneoxy group; and Ar is a substituted or unsubstituted $C_6$ to $C_{20}$ aryl group.

10. In 1 to 8, the monomer mixture may include about 50 wt % to less than about 100 wt % of the aromatic group-containing (meth)acrylic monomer and greater than about 0 wt % to about 50 wt % of the hydroxyl group-containing (meth)acrylic monomer.

11. In 1 to 10, the monomer mixture may include at least one of an amide group-containing (meth)acrylic monomer and an alkyl group-containing (meth)acrylic monomer.

12. In 1 to 11, the trigger polymer may include a copolymer of a monomer mixture including a (meth)acrylic monomer and a polymerizable functional group-containing polyorganosiloxane.

13. In 1 to 12, the (meth)acrylic monomer may include a linear chain or branched chain $C_{10}$ to $C_{20}$ alkyl group-containing (meth)acrylate.

14. In 1 to 13, the (meth)acrylic monomer may include at least one of stearyl (meth)acrylate and lauryl (meth)acrylate.

15. In 1 to 14, the trigger polymer may be present in an amount of greater than about 0 wt % to about 20 wt % in the adhesive film.

16. In 1 to 15, the adhesive film may further include a crosslinking agent.

17. In 1 to 16, the adhesive film may further include a UV absorbent and the adhesive film may have a light transmittance of about 70% or less at a wavelength of 390 nm or less.

Another aspect of the present invention is an optical member.

18. The optical member includes the adhesive film according to the present invention.

19. In 18, the optical member may include a light emitting diode panel; and a touchscreen panel, the adhesive film, and an optical film sequentially stacked on an upper surface of the light emitting diode panel.

20. In 18 and 19, the touchscreen panel may at least directly contact the adhesive film.

21. In 18 to 20, the optical member may further include at least a passivation layer at an interface between the touchscreen panel and the adhesive film.

An optical display device according to the present invention includes the adhesive film according to the present invention.

Advantageous Effects

The present invention provides an adhesive film that allows remarkable increase in adhesive strength upon heat treatment.

The present invention provides an adhesive film that has low haze to secure good optical characteristics and exhibits good step embedding properties.

The present invention provides an adhesive film that has high index of refraction.

The present invention provides an adhesive film that has good processability.

DESCRIPTION OF DRAWINGS

FIG. 1 is a sectional view of an optical member according to one embodiment of the present invention.

FIG. 2 is a sectional view of a specimen for measurement of adhesive strength.

BEST MODE

Hereinafter, embodiments of the present invention will be described in detail with reference to the accompanying drawings such that the present invention can be easily implemented by a person having ordinary knowledge in the art. It should be understood that the present invention may be embodied in different ways and is not limited to the following embodiments.

In the drawings, components unrelated to description are omitted for clear description of the invention and like components will be denoted by like reference numerals throughout the specification. Although lengths, thicknesses or widths of various components may be exaggerated for understanding in the drawings, the present invention is not limited thereto.

Herein, spatially relative terms, such as "upper" and "lower", are defined with reference to the accompanying drawings. Thus, it will be understood that the term "upper surface" can be used interchangeably with the term "lower surface".

Herein "(meth)acryl" refers to acryl and/or methacryl.

Herein, "index of refraction" is a value measured in the visible spectrum, for example, at a wavelength of 550 nm.

As used herein to represent a specific numerical range, "X to Y" means "greater than or equal to X and less than or equal to Y ($\leq$X and $\leq$Y)".

The adhesive film according to the present invention allows remarkable increase in adhesive strength with respect to an adherend by heat treatment, whereby the adhesive film can be stably secured to the adherend only by heat treatment after attachment of the adhesive film to the adherend, thereby enabling improvement in processability. In addition, the adhesive film according to the present invention has good step embedding properties to be easily secured to an adherend previously or additionally formed with a pattern thereon when attached to the adherend. Further, the adhesive film according to the present invention includes a (meth)acrylic based binder, inorganic particles and a trigger polymer, which are described below, and has low haze to exhibit good transparency and to be easily applied to an optical display device by solving a problem of increase in haze. Further, the adhesive film according to the present invention has a high index of refraction of 1.5 or more, preferably 1.6 or more, and thus can improve light extraction efficiency by minimizing reflection of light entering the adhesive film, as compared to a typical adhesive film, even when stacked on an adherend having high index of refraction.

Herein, "adherend" may include a touchscreen panel, a glass plate, a plastic film, a cured product such as ink jets, and the like.

Hereinafter, an adhesive film according to one embodiment of the present invention will be described.

The adhesive film according to the embodiment has a haze of about 2% or less and an adhesive strength ratio (ratio of B to A) of about 10 or more, as calculated according to Equation 1:

$$\text{Adhesive strength ratio} = B/A \qquad [\text{Equation 1}]$$

(In Equation 1,

A is initial adhesive strength (unit: gf/inch) of the adhesive film with respect to a glass plate, and B is adhesive strength (unit: gf/inch) of the adhesive film with respect to the glass plate after the adhesive film is attached to the glass plate and left at 50° C. for 1,000 seconds).

Within this range of adhesive strength ratio, the adhesive film can be easily secured to an adherend simply through heat treatment after the adhesive film is attached to the adherend, thereby improving processability. Specifically, the adhesive film may have the adhesive strength ratio of, for example, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200, specifically 10 to 200, more specifically 15 to 150, as calculated according to Equation 1.

In Equation 1, A may be about 100 gf/inch or less, for example, 5 gf/inch, 10 gf/inch, 15 gf/inch, 20 gf/inch, 25 gf/inch, 30 gf/inch, 35 gf/inch, 40 gf/inch, 45 gf/inch, 50 gf/inch, 55 gf/inch, 60 gf/inch, 65 gf/inch, 70 gf/inch, 75 gf/inch, 80 gf/inch, 85 gf/inch, 90 gf/inch, 95 gf/inch, or 100 gf/inch, specifically 5 gf/inch to 50 gf/inch. Within this range, the adhesive film can have good repeelability after attachment to an adherend. In Equation 1, A denotes an adhesive strength, as measured on a specimen, which is prepared by attaching a laminate of a base film and an adhesive film to an alkali-free glass plate, upon removal of the laminate of the base film and the adhesive film from the alkali-free glass plate at 25° C. under conditions of a peeling rate of 300 mm/min and a peeling angle of 180°. The base film may be a typical polymer film not subjected to release treatment. For example, the base film may be a polyethylene terephthalate (PET) film not subjected to release treatment.

In Equation 1, B may be about 500 gf/inch or more, for example, 500 gf/inch, 550 gf/inch, 600 gf/inch, 650 gf/inch, 700 gf/inch, 750 gf/inch, 800 gf/inch, 850 gf/inch, 900 gf/inch, 950 gf/inch, 1,000 gf/inch, 1,050 gf/inch, 1,100 gf/inch, 1,150 gf/inch, 1,200 gf/inch, 1,250 gf/inch, 1,300 gf/inch, 1,350 gf/inch, 1,400 gf/inch, 1,450 gf/inch, or 1,500 gf/inch, specifically 500 gf/inch to 1,500 gf/inch. Within this range, the adhesive film can be secured to an adherend without being easily removed therefrom. In Equation 1, B denotes an adhesive strength, as measured on a specimen, which is prepared by attaching a laminate of a base film and an adhesive film to an alkali-free glass plate, and the laminate is attached to the alkali-free glass plate and left at 50° C. for 1,000 sec, upon removal of the laminate of the base film and the adhesive film from the alkali-free glass plate at 25° C. under conditions of a peeling rate of 300 mm/min and a peeling angle of 180°. The base film may be a typical polymer film not subjected to release treatment. For example, the base film may be a polyethylene terephthalate (PET) film not subjected to release treatment.

Within the above range of haze, the adhesive film can improve light extraction efficiency through improvement in transmission efficiency of light received from the adherend. Specifically, the adhesive film may have a haze of 0%, 0.5%, 1%, 1.5%, or 2%, specifically 0% to 2%, more specifically 0% to 1%.

The adhesive film may have an index of refraction of about 1.5 or more, for example, 1.5, 1.55, 1.6, 1.65, 1.7, 1.75, or 1.8, preferably 1.6 or more, more preferably 1.6 to 1.8. Within this range of index of refraction, the adhesive film can reduce a difference in index of refraction with an adherend having high index of refraction to improve light extraction efficiency through reduction in reflection of light propagating from the adherend to the adhesive film.

The adhesive film according to the present invention includes a (meth)acrylic based binder containing an aromatic group and hydroxyl group, inorganic particles having an index of refraction of about 1.5 or more, and a trigger polymer.

The (meth)acrylic based binder containing an aromatic group and hydroxyl group can improve the index of refraction and adhesive strength of the adhesive film.

The (meth)acrylic based binder containing an aromatic group and hydroxyl group may have a weight average molecular weight of about 500,000 to about 3,000,000, specifically 1,000,000 to 2,000,000. Within this range, the adhesive film can exhibit good reliability under high temperature and high humidity conditions.

The (meth)acrylic based binder containing an aromatic group and hydroxyl group may include a (meth)acrylic based copolymer of a monomer mixture including an aromatic group-containing (meth)acrylic monomer and a hydroxyl group-containing (meth)acrylic monomer.

The aromatic group-containing (meth)acrylic monomer can improve an index of refraction of the adhesive film. The aromatic group-containing (meth)acrylic monomer may include a monomer having an index of refraction of about 1.55 or more, for example, 1.55, 1.6, 1.65, 1.7, 1.75, or 1.8, specifically 1.55 to 1.80, in a homopolymer phase.

In one embodiment, the aromatic group-containing (meth)acrylic monomer may include at least one kind of (meth)acrylate containing at least one aromatic group, preferably two or more kinds of (meth)acrylate containing at least one aromatic group. For example, the aromatic group-containing (meth)acrylic monomer may include a monomer represented by Formula 1:

$$CH_2=C(R^1)-C(=O)-O-R^2-Ar \qquad \text{[Formula 1]}$$

where:
$R^1$ is hydrogen or a methyl group;
$R^2$ is a single bond, a substituted or unsubstituted $C_1$ to $C_{10}$ alkylene group, or a substituted or unsubstituted $C_1$ to $C_{10}$ alkyleneoxy group; and
Ar is a substituted or unsubstituted $C_6$ to $C_{20}$ aryl group.

Preferably, the aromatic group-containing (meth)acrylic monomer includes a (meth)acrylic monomer including at least two of the substituted or unsubstituted aromatic groups. The (meth)acrylic monomer including at least two of the substituted or unsubstituted aromatic groups serves to secure suitable index of refraction of the adhesive film in combination with the inorganic particles.

In Formula 1, $R^2$ indicating a single bond means that —C(=O)O— is directly connected to Ar.

Preferably, in Formula 1, Ar may be substituted with a $C_6$ to $C_{20}$, preferably $C_6$ to $C_{10}$ aryl group, or a $C_6$ to $C_{20}$, preferably $C_6$ to $C_{10}$ aryloxy group.

In one embodiment, the aromatic group-containing (meth)acrylic monomer may include a mixture of the monomer of Formula 1 in which Ar is substituted with a $C_6$ to $C_{10}$ aryl group and the monomer of Formula 1 in which Ar is substituted with a $C_6$ to $C_{10}$ aryloxy group. In this embodiment, the adhesive film can easily realize the effects of the present invention.

For example, the aromatic group-containing (meth)acrylic monomer may include at least one, preferably at least two, of among benzyl (meth)acrylate, phenoxybenzyl (meth)acrylate, phenylphenoxyethyl (meth)acrylate, phenylbenzyl (meth)acrylate, biphenyl (meth)acrylate, and biphenylmethyl (meth)acrylate.

In the monomer mixture, the aromatic group-containing (meth)acrylic monomer may be present in an amount of about 30 wt % to less than about 100 wt %, for example, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, or 99 wt %, specifically 50 wt % to less than 100 wt %, more specifically 70 wt % to 95 wt %, still more specifically 70 wt % to 90 wt %. Within this range, the aromatic group-containing (meth)acrylic monomer can assist in improvement in adhesive strength of the adhesive film.

The hydroxyl group-containing (meth)acrylic monomer serves to impart adhesive strength to the adhesive film. The hydroxyl group-containing (meth)acrylic monomer may include at least one $C_1$ to $C_{10}$ (meth)acrylate containing at least one hydroxyl group. For example, the hydroxyl group-containing (meth)acrylic monomer may include at least one of 2-hydroxybutyl (meth)acrylate, 4-hydroxybutyl (meth)acrylate, 2-hydroxyethyl (meth)acrylate, 2-hydroxypropyl (meth)acrylate, 3-hydroxypropyl (meth)acrylate, and 6-hydroxyhexyl (meth)acrylate, without being limited thereto.

In the monomer mixture, the hydroxyl group-containing (meth)acrylic monomer may be present in an amount of greater than about 0 wt % to about 70 wt %, for example, 0.1 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, or 70 wt %, specifically greater than 0 wt % to 50 wt %, more specifically 5 wt % to 30 wt %, still more specifically 5 wt % to 25 wt %. Within this range, the hydroxyl group-containing (meth)acrylic monomer can improve adhesive strength of the adhesive film and haze of the adhesive film.

The monomer mixture may include at least one of an amide group-containing (meth)acrylic monomer and an alkyl group-containing (meth)acrylic monomer.

The amide group-containing (meth)acrylic monomer is advantageous in particle dispersion in the adhesive film and can provide a function of reducing haze of a film. The amide group-containing (meth)acrylic monomer may include at least one of (meth)acrylamide, octadecyl(meth)acrylamide, isopropyl (meth)acrylamide, aminopropyl (meth)acrylamide, diethylaminopropyl (meth)acrylamide, dimethylaminopropyl (meth)acrylamide, and N,N-diethyl (meth)acrylamide.

In the monomer mixture, the amide group-containing (meth)acrylic monomer may be present in an amount of about 0 wt % to about 20 wt %, for example, 0 wt %, 0.1 wt %, 1 wt %, 5 wt %, 10 wt %, 15 wt %, or 20 wt %, specifically 0 wt % to 10 wt %, more specifically 0.1 wt % to 10 wt %. Within this range, the amide group-containing (meth)acrylic monomer can improve adhesive strength of the adhesive film.

The alkyl group-containing (meth)acrylic monomer may include a linear chain or branched chain $C_1$ to $C_{20}$ (preferably $C_2$ to $C_{20}$) alkyl group-containing (meth)acrylic acid ester. The $C_1$ to $C_{20}$ alkyl group-containing (meth)acrylic acid ester may include at least one of methyl (meth)acrylate, ethyl (meth)acrylate, propyl (meth)acrylate, n-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and dodecyl (meth)acrylate, without being limited thereto.

In the monomer mixture, the alkyl group-containing (meth)acrylic monomer may be present in an amount of about 0 wt % to about 50 wt %, specifically 0 wt % to 30 wt %, more specifically 0.1 wt % to 10 wt %. Within this range, the alkyl group-containing (meth)acrylic monomer can improve adhesive strength of the adhesive film.

The (meth)acrylic based binder containing an aromatic group and hydroxyl group may be prepared using the monomer mixture by a typical method known to those skilled in the art.

In the adhesive film, the (meth)acrylic based binder containing an aromatic group and hydroxyl group may be present in an amount of about 10 wt % to about 90 wt %, for example, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %, specifically 10 wt % to less than 90 wt %, more specifically 30 wt % to 70 wt %. Within this range, the adhesive film can maintain mechanical strength while securing adhesive strength.

In the adhesive film, the inorganic particles having an index of refraction of about 1.5 or more serve to improve or maintain the index of refraction of the adhesive film.

The inorganic particles having an index of refraction of about 1.5 or more may include inorganic particles having an index of refraction of 1.5 or more, for example, 1.5, 1.55, 1.6, 1.65, 1.7, 1.75, or 1.8, specifically 1.5 to 1.8. Within this range, the inorganic particles can assist in improvement in index of refraction of the adhesive film, thereby improving light extraction efficiency by reducing reflection of light propagating from an adherend to the adhesive film stacked on the adherend. For example, the inorganic particles may include at least one of zirconia and titania, preferably zirconia.

The inorganic particles having an index of refraction of about 1.5 or more may have any shape, for example, a spherical shape, an amorphous shape, a flake shape, or a granular shape. The inorganic particles may have a smaller average particle diameter (D50) than the thickness of the adhesive film, and may have an average particle diameter (D50) of about 1 nm to about 100 nm, for example, 1 nm, 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm, specifically 5 nm to 50 nm. Within this range, the inorganic particles can be included in the adhesive film and can realize the effects of the adhesive film. Here, "average particle diameter (D50)" may be measured by a typical method known to those skilled in the art. For example, the average particle diameter (D50) means a particle diameter corresponding to 50% in a weight cumulative distribution of the inorganic particles using a particle size analyzer.

Although inorganic particles not subjected to surface treatment as the inorganic particles having an index of refraction of about 1.5 or more can also be used, the inorganic particles having an index of refraction of about 1.5 or more may include inorganic particles subjected to surface treatment in order to allow efficient distribution of the inorganic particles in an adhesive composition, thereby improving transparency of the adhesive film through improvement in optical characteristics of the adhesive film. Surface treatment may be performed by a typical method known to those skilled in the art. For example, the inorganic particles may be subjected to surface treatment with a (meth)acrylic compound and the like.

In the adhesive film, the inorganic particles having an index of refraction of about 1.5 or more may be present in an amount of about 10 wt % to about 90 wt %, for example, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %, specifically 10 wt % to less than 90 wt %, more specifically 30 wt % to 70 wt %. Within this range, the inorganic particles can improve the index of refraction of the adhesive film without affecting haze of the adhesive film.

Relative to the total sum of 100 parts by weight of the (meth)acrylic based binder containing an aromatic group and hydroxyl group and the inorganic particles having an index of refraction of 1.5 or more, the (meth)acrylic based binder containing an aromatic group and hydroxyl group may be present in an amount of about 10 parts by weight to about 90 parts by weight, for example, 10, 15, 20, 25, 30, 35, 40, 45, 50, 55, 60, 65, 70, 75, 80, 85, or 90 parts by weight, preferably 30 parts by weight to 70 parts by weight, and the inorganic particles having an index of refraction of 1.5 or more may be present in an amount of 10 parts by weight to 90 parts by weight, for example, 10, 15, 20, 25, 30, 35, 40, 45, 50, 55, 60, 65, 70, 75, 80, 85, or 90 parts by weight, preferably 30 parts by weight to 70 parts by weight. Within this range, the index of refraction of the adhesive film can be increased while allowing improvement in adhesive strength of the adhesive film through heat treatment.

The trigger polymer has a melting temperature (Tm) of about 0° C. or more. The trigger polymer having a melting temperature (Tm) of about 0° C. or more can assist in increase in adhesive strength of the adhesive film by heat treatment of the adhesive film. The trigger polymer may refer to a polymer that can increase adhesive strength of the adhesive film by heat treatment. Specifically, the trigger polymer may have a melting temperature of, for example, 0° C., 1° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., or 100° C., specifically 10° C. to 100° C., specifically 25° C. to 80° C. The melting temperature (Tm) may be measured by a typical method known to those skilled in the art, for example, by differential scanning calorimetry (DSC), without being limited thereto.

The trigger polymer may include a copolymer of a monomer mixture including a (meth)acrylic monomer and a polymerizable functional group-containing polyorganosiloxane.

The (meth)acrylic monomer may be selected from among (meth)acrylic monomers having a suitable range of Tg so as to provide the trigger polymer having a melting temperature of 0° C. or more. For example, the (meth)acrylic monomer may be selected from among (meth)acrylic monomers having a glass transition temperature (Tg) of about 0° C. to about 50° C., for example, 0° C., 1° C., 5° C., 10° C., 15° C., 20° C., 25° C., 30° C., 35° C., 40° C., 45° C., 50° C., specifically 10° C. to 35° C., in a homopolymer phase. Within this range, the (meth)acrylic monomer can allow easy preparation of the trigger polymer having a melting temperature of 0° C. or more upon polymerization with the polyorganosiloxane. For example, the (meth)acrylic monomer may include a linear chain or branched chain long-chain alkyl group-containing (meth)acrylate. Specifically, the (meth)acrylic monomer may be a linear chain or branched chain $C_{10}$ to $C_{20}$ alkyl group-containing (meth)acrylate. For example, the (meth)acrylic monomer may include stearyl (meth)acrylate, lauryl (meth)acrylate, and the like, without being limited thereto.

The polymerizable functional group-containing polyorganosiloxane can assist in improvement in adhesive strength of the adhesive film by promoting migration of the trigger polymer to the surface of the adhesive film. The polymerizable functional group-containing polyorganosiloxane has one polymerizable functional group and may include a compound represented by, for example, Formula 2.

[Formula 2]

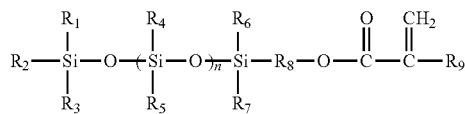

where:
$R_1$, $R_2$, $R_3$, $R_4$, $R_5$, $R_6$, and $R_7$ are each independently hydrogen, a $C_1$ to $C_{10}$ alkyl group, a $C_3$ to $C_{10}$ cycloalkyl group, or a $C_6$ to $C_{10}$ aryl group;
$R_8$ is a $C_1$ to $C_{10}$ alkylene group, a $C_6$ to $C_{10}$ arylene group, or a $C_1$ to $C_{10}$ alkyleneoxy group;
$R_9$ is hydrogen or a methyl group; and n is an integer of 1 to 100.

The monomer mixture for the trigger polymer may include about 95 wt % to about 99 wt % of the (meth)acrylic monomer and about 1 wt % to about 5 wt % of the polymerizable functional group-containing polyorganosiloxane. Within this range, the monomer mixture allows improvement in adhesive strength of the adhesive film by heat treatment.

The trigger polymer may be present in an amount of greater than about 1 part by weight to less than about 10 parts by weight, for example, 2, 3, 4, 5, 6, 7, 8, or 9 parts by weight, relative to the total sum of 100 parts by weight of the (meth)acrylic based binder containing an aromatic group and hydroxyl group and the inorganic particles having an index of refraction of 1.5 or more. Within this range, the trigger polymer can improve adhesive strength of the adhesive film by heat treatment and step embedding properties thereof while suppressing increase in haze thereof. Specifically, the trigger polymer may be present in an amount of 2 parts by weight to 9 parts by weight.

In the adhesive film, the trigger polymer may be present in an amount of about 0 wt % to about 20 wt %, for example, 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %, specifically greater than 0 wt % to 20 wt %, more specifically 1 wt % to 9 wt %. Within this range, the trigger polymer can improve adhesive strength of the adhesive film by heat treatment while increasing initial adhesive strength of the adhesive film.

The adhesive film may further include a silane coupling agent.

The silane coupling agent serves to increase peeling strength of the adhesive film with respect to an adherend. The silane coupling agent may a typical silane coupling agent kwon to those skilled in the art. For example, the silane coupling agent may include at least one of the group consisting of silicone compounds having an epoxy structure, such as 3-glycidoxypropyltrimethoxysilane, 3-glycidoxypropylmethyldimethoxysilane, 2-(3,4-epoxycyclohexyl)ethyltrimethoxysilane, and the like; silicone compounds having a polymerizable unsaturated group, such as vinyltrimethoxysilane, vinyltriethoxysilane, (meth)acryloxypropyltrimethoxysilane, and the like; amino group-containing silicone compounds, such as 3-aminopropyl trimethoxysilane, N-(2-aminoethyl)-3-aminopropyltrimethoxysilane, N-(2-aminoethyl)-3-aminopropylmethyldimethoxysilane, and the like; 3-chloropropyl trimethoxysilane; and combinations thereof, without being limited thereto.

The silane coupling agent may be present in an amount of about 0 wt % to about 5 wt %, specifically 0.1 wt % to 3 wt %, in the adhesive film. Within this range, the silane coupling agent can improve adhesive strength of the adhesive film with respect to an adherend without affecting other properties of the adhesive film.

The adhesive film may further include a UV absorbent.

The UV absorbent serves to extend lifespan of a light emitting diode by preventing damage to the light emitting diode inside a light emitting display panel stacked on a lower surface of an adherend through absorption of external UV light. In one embodiment, the adhesive film including the UV absorbent may have a light transmittance of about 70% or less, for example, 0%, 5%, 10%, 15%, 20%, 25%, 30%, 35%, 40%, 45%, 50%, 55%, 60%, 65%, or 70%, specifically 0% to 70%, at a wavelength of 390 nm or less, for example, 380 nm to 390 nm. Within this range, the UV absorbent can prevent damage to the light emitting diode.

In one embodiment, the UV absorbent may have a maximum absorption wavelength of about 350 nm to about 450 nm, specifically 370 nm to 400 nm. Within this range, the UV absorbent can prevent damage to the light emitting diode without deterioration in adhesive strength of the adhesive film by UV irradiation. Here, "maximum absorption wavelength" may be measured by a typical method known to those skilled in the art.

In one embodiment, the UV absorbent may be an indole-based UV absorbent, without being limited thereto.

The UV absorbent may be present in an amount of about 0 wt % to about 1.0 wt %, specifically 0.1 wt % to 0.5 wt %, in the adhesive film. Within this range, the UV absorbent can prevent damage to the light emitting diode without deterioration in adhesive strength of the adhesive film by UV irradiation.

The adhesive film may further include typical additives, such as antistatic agents, surfactants, curing accelerators, ionic liquids, lithium salts, inorganic fillers, softeners, molecular weight regulators, antioxidants, anti-aging agents, stabilizers, tackifier resins, modification resins (polyol resins, phenolic resins, acrylic resins, polyester resins, polyolefin resins, epoxy resins, epoxidated polybutadiene resins, and the like), leveling agents, antifoaming agents, plasticizers, dyes, pigments (coloring pigments, extender pigments, and the like), treatment agents, fluorescent brighteners, dispersants, heat stabilizers, light stabilizers, coagulants, and lubricants, without being limited thereto.

The additives may be present in an amount of 10 wt %, or less, specifically 0.01 wt % to 10 wt %, more specifically 0.01 wt % to 1 wt %, in the adhesive film. Within this range, the additives can exhibit inherent effects thereof without affecting adhesive strength and reliability of the adhesive film.

The adhesive film may have a thickness of about 200 μm or less, for example, greater than 0 μm to 200 μm, for example, 10 μm to 100 μm. Within this range, the adhesive film can be applied to an optical display device.

The adhesive film may have a glass transition temperature of about −50° C. to about −10° C., for example, −50° C., −45° C., −40° C., −35° C., −30° C., −25° C., −20° C., −15° C., or −10° C., specifically −40° C. to −20° C. Within this range, the adhesive film can exhibit suitable adhesive properties.

The adhesive film may be manufactured by coating an adhesive composition on one surface of a base film to form a coating layer, followed by drying and curing the coating layer. To prevent foreign matter from being attached to the adhesive film after the coating layer is subjected to aging, a release film may be additionally attached to one surface of the adhesive film. The base film is the same as described above. Drying may include a process of treating the coating layer at 100° C. to 150° C. for about 0.5 min to about 5 min, without being limited thereto. Aging may include a process of treating the coating layer at about 40° C. to about 80° C. for about 0.5 days to about 3 days, without being limited thereto.

The adhesive composition includes the (meth)acrylic based binder containing an aromatic group and hydroxyl group, the inorganic particles having an index of refraction of 1.5 or more, and the trigger polymer. The adhesive composition may further include a solvent. The solvent allows uniform coating of the adhesive composition by improving coating properties of the adhesive composition. The solvent may include at least one typical organic solvent known to those skilled in the art.

Next, an adhesive film according to another embodiment of the invention will be described.

The adhesive film according to this embodiment may have a haze of about 2% or less and an adhesive strength ratio of about 10 or more, as calculated according to Equation 1. The adhesive film according to this embodiment includes a (meth)acrylic based binder containing an aromatic group and hydroxyl group, inorganic particles having an index of refraction of about 1.5 or more, a trigger polymer, and a crosslinking agent. The adhesive film according to this embodiment is substantially the same as the adhesive film according to the above embodiment. The adhesive film may further include a silane coupling agent, a UV absorbent, and various additives.

Details and ranges of the haze, the adhesive strength ratio of Equation 1 (including adhesive strength A and adhesive strength B), the index of refraction, the (meth)acrylic based binder containing an aromatic group and hydroxyl group, the inorganic particles having an index of refraction of about 1.5 or more, the trigger polymer, the silane coupling agent, the UV absorbent, and various additives are substantially the same as those described in the adhesive film according to the above embodiment of the invention.

The crosslinking agent can improve reliability of the adhesive film by curing the (meth)acrylic based binder containing an aromatic group and hydroxyl group. The adhesive film may include a (meth)acrylic matrix formed of the (meth)acrylic based binder containing an aromatic group and hydroxyl group and the crosslinking agent.

The crosslinking agent may include a typical heat curing agent used to heat cure the (meth)acrylic based binder containing an aromatic group and hydroxyl group. For example, the crosslinking agent may include at least one of an isocyanate based crosslinking agent, a carbodiimide based crosslinking agent, an aziridine based crosslinking agent, and an epoxy based crosslinking agent. Preferably, the crosslinking agent includes an isocyanate based crosslinking agent.

The isocyanate based crosslinking agent may include a bi- or higher functional isocyanate based crosslinking agent, for example, a bi- to hexa-functional isocyanate based crosslinking agent. In one embodiment, isocyanate based crosslinking agent may include at least one of xylene diisocyanates (XDI) including m-xylene diisocyanate and the like, methylene bis(phenyl isocyanate) (MDI) including 4,4'-methylene bis(phenyl isocyanate) and the like, naphthalene diisocyanate, tolylene diisocyanate, hexamethylene diisocyanate, isophorone diisocyanate, adducts thereof, and isocyanurates thereof. For example, the adducts or isocyanurates may include trimethylol propane adducts of tolylene diisocyanate, trimethylol propane adducts of hexamethylene diisocyanate, trimethylol propane adducts of isophorone diisocyanate, trimethylol propane adducts of xylene diisocyanate, isocyanurates of tolylene diisocyanate, isocyanurates of hexamethylene diisocyanate, and isocyanurates of isophorone diisocyanate.

The crosslinking agent may be present in an amount of about 0 parts by weight to about 10 parts by weight, for example, 0, 0.01, 0.02, 0.03, 0.04, 0.05, 0.06, 0.07, 0.08, 0.09, 0.1, 1, 2, 3, 4, 5, 6, 7, 8, 9, or 10 parts by weight, specifically 0 parts by weight to 0.1 parts by weight, relative to the total sum of 100 parts by weight of the (meth)acrylic based binder containing an aromatic group and hydroxyl group and the inorganic particles having an index of refraction of about 1.5 or more. Within this range, the crosslinking agent allows formation of an adhesive and control of suitable adhesive strength through crosslinking of the (meth)acrylic binder.

Next, an optical member according to one embodiment will be described.

The optical member according to this embodiment includes the adhesive film according to the present invention. In one embodiment, the optical member includes the adhesive film and an adherend stacked on a lower surface of the adhesive film. In one embodiment, the adherend may have a higher index of refraction than the adhesive film. Light emitted through the lower surface of the adherend may pass through the adhesive film. The adhesive film can improve light extraction efficiency by reducing a difference in index of refraction with the adherend. For example, the adherend may have an index of refraction of 1.7 or more, specifically 1.7 to 2.0.

FIG. 1 is a sectional view of an optical member according to one embodiment of the invention.

Referring to FIG. 1, the optical member includes a light emitting diode panel 110; a touchscreen panel 120, an adhesive film 140 and an optical film 150 sequentially stacked on an upper surface of the light emitting diode panel 110. A patterned passivation layer 130 is formed at an interface between the touchscreen panel 120 and the adhesive film 140.

The light emitting diode panel 110 includes red (R), green (G), and blue (B) light emitting diodes and emits light for operation of a display device.

The touchscreen panel 120 enables the display device to receive input data through a screen such that the display device can perform a specific process by detecting a location of a touch on the screen of the display device upon touch of the screen with the hand or a pen. The touchscreen panel 120 is formed of a metallic material, such as aluminum, titanium, and the like, and may have an index of refraction of 2 or more, for example, 2 to 4.

The passivation layer 130 and the adhesive film 140 can improve light extraction efficiency by reducing a difference in index of refraction between the touchscreen panel 120 and the optical film 150. As shown in FIG. 1, the passivation layer 130 is formed with a predetermined pattern to improve efficiency in extraction of light propagating from the touchscreen panel 120 to the adhesive film 140.

The adhesive film 140 includes the adhesive film according to the present invention. The touchscreen panel 120 at least directly contacts the adhesive film 140.

The optical film 150 may include a window film, a window, a polarizer, a color filter, a retardation film, an elliptical polarizing film, a reflective polarizing film, an antireflection film, a compensation film, a brightness-enhancing film, an alignment film, a light diffusion film, a glass shatterproof film, a surface protective film, and the like. Preferably, the optical film 150 includes a polarizer.

The optical display device according to the present invention includes the adhesive film or the optical member according to the present invention. The optical display device may include a light emitting diode display including an organic light emitting device display, a liquid crystal display, and the like.

MODE FOR INVENTION

Next, the present invention will be described in more detail with reference to some examples. However, it should be noted that these examples are provided for illustration only and are not to be construed in any way as limiting the invention.

Example 1

A monomer mixture including 5 parts by weight of stearyl methacrylate (STMA) and 0.1 parts by weight of a silicon-containing monoacrylate (BYK-3530) was placed in a reactor, followed by adding a solvent (toluene) thereto. A trigger polymer having a melting temperature (Tm) of 33° C. was prepared through polymerization of the monomer mixture at 60° C. while purging the reactor with nitrogen after addition of a UV initiator to the reactor.

In the reactor, 100 parts by weight of a monomer mixture including 70 parts by weight of 2-phenoxybenzyl acrylate (PBA-001, Hannong Chemical Co., Ltd.), 10 parts by weight of benzyl acrylate (BzA), 15 parts by weight of 4-hydroxybutyl acrylate (4-HBA), and 5 parts by weight of N,N-diethyl acrylamide (DEAA) was placed and a suitable amount of ethyl acetate was added as a solvent thereto. A (meth)acrylic based binder (weight average molecular weight: 1,000,000) having units derived from 2-phenoxybenzyl acrylate, benzyl acrylate, 4-hydroxybutyl acrylate, and N,N-diethyl acrylamide was prepared through polymerization of the monomer mixture while purging the reactor with nitrogen after addition of a UV initiator to the reactor.

A zirconia-containing sol (ZP-158, average particle diameter (D50): 15 nm, surface treatment is subjected, index of refraction of zirconia: 1.69, Nippon Shokubai Co., Ltd.) was added to the prepared (meth)acrylic binder such that the (meth)acrylic based binder was present in an amount of 50 parts by weight and zirconia was present in an amount of 50 parts by weight based on the solid content.

Thereafter, an adhesive composition was prepared by mixing 100 parts by weight of 50 parts by weight of the binder and 50 parts by weight of zirconia with 5 parts by weight of the prepared trigger polymer and 0.02 parts by weight of a crosslinking agent (L-45, isocyanate based crosslinking agent, Soken Co., Ltd.), followed by degassing.

A laminate of a base film (polyethylene terephthalate film, TU73A, thickness: 75 μm, no release treatment, SKC), an adhesive film (thickness: 25 μm), and a release film (polyethylene terephthalate film, RF12AS, thickness: 75 μm, release treatment, SKC) was prepared by depositing the adhesive composition to a thickness of 20 μm to 25 μm on one surface of the base film, drying the adhesive composition at 120° C. for 2 minutes, and curing (aging) the adhesive composition at 50° C. for 2 days, followed by covering a cured product with the release film.

Examples 2 to 6

A laminate of a base film, an adhesive film, and a release film was prepared in the same manner as in Example 1 except that the content of each component was changed as listed in Table 1 (unit: parts by weight).

Comparative Examples 1 and 2

A laminate of a base film, an adhesive film, and a release film was prepared in the same manner as in Example 1 except that the content of each component was changed as listed in Table 1 (unit: parts by weight).

TABLE 1

|  | Binder | | Zirconia | Trigger polymer | | Crosslinking agent | UV absorbent |
| --- | --- | --- | --- | --- | --- | --- | --- |
|  | Kind | Content | Content | Kind | Content | Content | Content |
| Example 1 | A | 50 | 50 | A | 5 | 0.02 | 0 |
| Example 2 | A | 50 | 50 | A | 5 | 0.015 | 0 |
| Example 3 | A | 50 | 50 | A | 5 | 0.01 | 0 |
| Example 4 | A | 50 | 50 | A | 5 | 0.005 | 0 |
| Example 5 | B | 50 | 50 | B | 5 | 0.01 | 0 |
| Example 6 | A | 50 | 50 | A | 5 | 0.01 | 0.3 |
| Comparative Example 1 | A | 50 | 50 | A | 10 | 0.01 | 0 |
| Comparative Example 2 | A | 50 | 50 | A | 0 | 0.01 | 0 |

In Table 1,

Binder A: (Meth)acrylic binder of PBA-001, BzA, 4-HBA and DEAA,

Binder B: (Meth)acrylic binder of a monomer mixture including 70 parts by weight of PBA-001, 10 parts by weight of BzA and 20 parts by weight of 4-HBA, Trigger polymer A: Polymer of STMA and BYK-3530, Tm: 33° C., Trigger polymer B: Polymer of a monomer mixture including 5 parts by weight of lauryl acrylate and 0.1 parts by weight of BYK-3530, Tm: 25° C., and UV absorbent: UV-3912 (indole-based, Orient Chemical Co., Ltd.)

The laminates prepared in Examples and Comparative Examples were evaluated as to properties of Table 2 and evaluation results are shown in Table 2.

(1) Equation 1: Referring to FIG. 2, a laminate 10 of the base film/adhesive film was prepared by removing the release film from the laminate of the base film/adhesive film/release film (width×length, 2.5 cm×20 cm) prepared in each of Examples and Comparative Examples. Then, a specimen having a cross-section, as shown in FIG. 2, was prepared by attaching an alkali-free glass plate 20 (width×length, 4 cm×15 cm) to the laminate of the adhesive film/base film. With one end 10a of the laminate secured to a jig of an adhesive strength meter (TA Instrument Inc.), adhesive strength (A in Equation 1, unit: gf/inch) of the specimen was measured upon removal of the laminate of the base film and the adhesive film from the alkali-free glass plate at 25° C. under conditions of a peeling rate of 300 mm/min and a peeling angle of 180°.

A specimen as shown in FIG. 2 was prepared in the same manner as above by removing the release film from the laminate of the base film/adhesive film/release film (width×length, 2.5 cm×20 cm) prepared in each of Examples and Comparative Examples, followed by attaching the laminate of the adhesive film/base film to an alkali-free glass plate. The prepared specimen was left in an autoclave at 50° C. and at 5.5 bar for 1,000 sec. Thereafter, with the specimen secured to the adhesive strength meter (TA Instrument Inc.) as above, adhesive strength (B in Equation 1, unit: gf/inch) of the specimen was measured upon removal of the laminate of the base film and the adhesive film from the alkali-free glass plate at 25° C. under conditions of a peeling rate of 300 mm/min and a peeling angle of 180°.

(2) Haze (unit:%): Haze was measured on a specimen using a haze meter (NDH-9000) in the visible spectrum, in which the specimen was prepared by removing the base film and the release film from the laminate and attaching the adhesive film to an alkali-free glass plate.

(3) Index of refraction: Index of refraction was measured on a specimen using a refractivity meter (Prism coupler) in the visible light spectrum, in which the specimen was prepared by removing the base film and the release film from the laminate.

(4) Step embedding property: With the release film removed from the laminate of the base film/adhesive film/release film prepared in Examples and Comparative Examples, the laminate was attached to a substrate having a pattern having a height of 2 μm via the adhesive film thereof to prepare a specimen, which in turn was autoclaved (at 3.5 bar and at 55° C.), followed by observing generation of bubbles at an interface between the adhesive film and the pattern through a microscope. Generation of no bubbles was rated as OK and generation of slight bubbles was rated as no go (NG).

(5) Light transmittance (unit:%): Light transmittance was measured on a specimen using a light transmittance meter (UV-spectrometer) at a wavelength of 390 nm, in which the specimen was prepared by removing the base film and the release film from the laminate and attaching the adhesive film to an alkali-free glass plate.

TABLE 2

|  | Adhesive strength | | | Haze | Index of refraction | Step property embedding | Light transmittance |
| --- | --- | --- | --- | --- | --- | --- | --- |
|  | A | B | Equation 1 | | | | |
| Example 1 | 50 | 950 | 19 | 0.5 | 1.62 | OK | 91 |
| Example 2 | 30 | 900 | 30 | 0.6 | 1.61 | OK | 91 |
| Example 3 | 10 | 850 | 85 | 0.7 | 1.61 | OK | 91 |
| Example 4 | 5 | 700 | 140 | 0.9 | 1.6 | OK | 91 |
| Example 5 | 50 | 850 | 17 | 1.5 | 1.6 | OK | 90 |
| Example 6 | 50 | 920 | 18.4 | 0.8 | 1.6 | OK | 17 |
| Comparative Example 1 | 20 | 1100 | 55 | 7 | 1.6 | NG | 88 |

TABLE 2-continued

| | Adhesive strength | | | | Index of | Step property | Light |
| --- | --- | --- | --- | --- | --- | --- | --- |
| | A | B | Equation 1 | Haze | refraction | embedding | transmittance |
| Comparative Example 2 | 40 | 50 | 1.25 | 0.5 | 1.61 | OK | 91 |

As shown in Table 2, the adhesive films according to the present invention had high indexes of refraction and low haze, thereby securing good optical characteristics and high light extraction efficiency. In addition, the adhesive films according to the present invention allowed increase in adhesive strength ratio to 10 or more, as calculated according to Equation 1 by heat treatment, thereby improving processability and step embedding properties.

Conversely, the adhesive films of Comparative Examples 1 and 2 failed to achieve the effects of the present invention.

It should be understood that various modifications, changes, alterations, and equivalent embodiments can be made by those skilled in the art without departing from the spirit and scope of the invention.

The invention claimed is:

1. An adhesive film comprising: a (meth)acrylic based binder containing an aromatic group and hydroxyl group, inorganic particles and a trigger polymer,
    wherein the trigger polymer has a melting temperature (Tm) of about 0° C. or more; and
    the adhesive film has a haze of about 2% or less and
    the adhesive film has an adhesive strength ratio of about 10 or more, as calculated according to Equation 1:

Adhesive strength ratio=$B/A$    [Equation 1]

where A is initial adhesive strength (unit: gf/inch) of the adhesive film with respect to a glass plate, and
    B is adhesive strength (unit: gf/inch) of the adhesive film with respect to the glass plate after the adhesive film is attached to the glass plate and left at 50° C. for 1,000 sec,
    wherein the (meth)acrylic based binder comprises a (meth)acrylic copolymer of a monomer mixture, the monomer mixture comprising a first aromatic group-containing (meth)acrylic monomer represented by Formula 1:

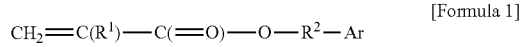    [Formula 1]

where:
    $R^1$ is hydrogen or a methyl group;
    $R^2$ is a single bond, a substituted or unsubstituted $C_1$ to $C_{10}$ alkylene group, or a substituted or unsubstituted $C_1$ to $C_{10}$ alkyleneoxy group, and
    Ar is a $C_6$ to $C_{20}$ aryl group substituted with a $C_6$ to $C_{10}$ aryloxy group.

2. The adhesive film according to claim 1, wherein, in Equation 1, A is about 65 gf/inch or less and B is about 650 gf/inch or more.

3. The adhesive film according to claim 1, wherein the adhesive film has an index of refraction of about 1.5 or more.

4. The adhesive film according to claim 1, wherein the inorganic particles have an index of refraction of about 1.5 or more.

5. The adhesive film according to claim 1, wherein the inorganic particles comprise zirconia.

6. The adhesive film according to claim 1, wherein the inorganic particles are present in an amount of about 10 wt % to about 90 wt % in the adhesive film.

7. The adhesive film according to claim 1, wherein the monomer mixture further comprises a second aromatic group-containing (meth)acrylic monomer and a hydroxyl group-containing (meth)acrylic monomer.

8. The adhesive film according to claim 7, wherein the second aromatic group-containing (meth)acrylic monomer comprises a monomer of Formula 1:

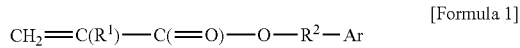    [Formula 1]

where:
$R^1$ is hydrogen or a methyl group;
$R^2$ is a single bond, a substituted or unsubstituted $C_1$ to $C_{10}$ alkylene group, or a substituted or unsubstituted $C_1$ to $C_{10}$ alkyleneoxy group, and
Ar is a substituted or unsubstituted $C_6$ to $C_{20}$ aryl group, and
the second aromatic group-containing (meth)acrylic monomer is different from the first aromatic group-containing (meth)acrylic monomer.

9. The adhesive film according to claim 7, wherein the monomer mixture comprises about 30 wt % to less than about 100 wt % of the first and second aromatic group-containing (meth)acrylic monomers and greater than about 0 wt % to about 70 wt % of the hydroxyl group-containing (meth)acrylic monomer.

10. The adhesive film according to claim 7, wherein the monomer mixture further comprises at least one of an amide group-containing (meth)acrylic monomer or an alkyl group-containing (meth)acrylic monomer.

11. The adhesive film according to claim 1, wherein the trigger polymer comprises a copolymer of a monomer mixture comprising a (meth)acrylic monomer and a polymerizable functional group-containing polyorganosiloxane.

12. The adhesive film according to claim 11, wherein the (meth)acrylic monomer comprises a linear chain or branched chain $C_{10}$ to $C_{20}$ alkyl group-containing (meth)acrylate.

13. The adhesive film according to claim 12, wherein the (meth)acrylic monomer comprises at least one of stearyl (meth)acrylate or lauryl (meth)acrylate.

14. The adhesive film according to claim 1, wherein the trigger polymer is present in an amount of greater than about 0 wt % to about 20 wt % in the adhesive film.

15. The adhesive film according to claim 1, further comprising: a crosslinking agent.

16. The adhesive film according to claim 1, further comprising:
a UV absorbent,
wherein the adhesive film has a light transmittance of about 70% or less at a wavelength of 390 nm or less.

17. An optical member comprising the adhesive film according to claim 1.

18. The optical member according to claim 17, comprising: a light emitting diode panel; and a touchscreen panel, the adhesive film, and an optical film sequentially stacked on an upper surface of the light emitting diode panel.

19. The optical member according to claim 18, wherein a portion of the touchscreen panel directly contacts the adhesive film.

20. The optical member according to claim 19, further comprising:
a passivation layer at a portion of an interface between the touchscreen panel and the adhesive film.

21. An optical display device comprising the adhesive film according to claim 1.

22. An adhesive film comprising: a (meth)acrylic based binder containing an aromatic group and hydroxyl group, inorganic particles, and a trigger polymer,
wherein the trigger polymer has a melting temperature (Tm) of about 0° C. or more; and
the adhesive film has a haze of about 2% or less,
the adhesive film has an initial adhesive strength of about 100 gf/inch or less with respect to a glass plate, and
the adhesive film has an adhesive strength of about 500 gf/inch or more with respect to the glass plate after the adhesive film is attached to the glass plate and left at 50° C. for 1,000 sec,
wherein the (meth)acrylic based binder comprises a (meth)acrylic copolymer of a monomer mixture, the monomer mixture comprising a first aromatic group-containing (meth)acrylic monomer represented by Formula 1:

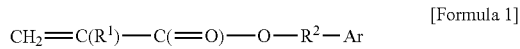
[Formula 1]

where:
$R^1$ is hydrogen or a methyl group;
$R^2$ is a single bond, a substituted or unsubstituted $C_1$ to $C_{10}$ alkylene group, or a substituted or unsubstituted $C_1$ to $C_{10}$ alkyleneoxy group, and
Ar is a $C_6$ to $C_{20}$ aryl group substituted with a $C_6$ to $C_{10}$ aryloxy group.

23. An optical member comprising the adhesive film according to claim 22.

24. An optical display device comprising the adhesive film according to claim 22.

* * * * *